May 17, 1960 — G. M. SCHIEDEL — 2,936,610
DIFFERENTIAL PRESSURE TESTING MEANS
Filed May 22, 1957 — 5 Sheets-Sheet 1

G. M. SCHIEDEL
INVENTOR.

BY E. C. McRae
J. R. Faulkner
D. H. Oster

ATTORNEYS

May 17, 1960 G. M. SCHIEDEL 2,936,610
DIFFERENTIAL PRESSURE TESTING MEANS
Filed May 22, 1957 5 Sheets-Sheet 2

G. M. SCHIEDEL
INVENTOR.

BY E. C. McRae
J. C. Faulkner
B. H. Oster

ATTORNEYS

May 17, 1960  G. M. SCHIEDEL  2,936,610
DIFFERENTIAL PRESSURE TESTING MEANS
Filed May 22, 1957  5 Sheets-Sheet 4

G. M. SCHIEDEL
INVENTOR.

BY E. C. McRae
J. R. Faulkner
F. H. Oster

ATTORNEYS

May 17, 1960 G. M. SCHIEDEL 2,936,610
DIFFERENTIAL PRESSURE TESTING MEANS
Filed May 22, 1957 5 Sheets-Sheet 5

G. M. SCHIEDEL
INVENTOR.

BY
ATTORNEYS

United States Patent Office 2,936,610
Patented May 17, 1960

2,936,610

DIFFERENTIAL PRESSURE TESTING MEANS

George M. Schiedel, Ypsilanti, Mich., assignor to Ford Motor Company, Dearborn, Mich., a corporation of Delaware Application May 22, 1957, Serial No. 660,978

3 Claims. (Cl. 73—40)

This invention relates to the testing of water tight compartments and more particularly to an apparatus for testing heater cores for automobile hot water heaters and similar articles.

It is essential in the production of heater cores that they be rapidly, accurately and inexpensively tested for leaks. The detection of small leaks in a relatively large volume such as a heater core requires sensitive test apparatus which is designed to withstand large leaks that may occur in a defective part.

Until this invention was put into actual use, to my knowledge the only commercially successful procedure by which cores of this type were tested was by actual submersion in water under pressure. This obvious method has serious disadvantages since it requires continuous and careful visual scrutiny to observe minute leaks, and to distinguish them from the many air bubbles that are caused by the submersion of the part. In many cases a leak would go unnoticed because it was masked by the part itself.

Attempts to adapt sensitive differential pressure devices to the testing of this type of product failed for the reason that prior instruments which were sufficiently sensitive to detect small leaks were rendered useless upon the sudden failure of a core under pressure.

It is an object of my invention to provide a leak-testing apparatus that is simple to operate and gives rapid and accurate indications of quality and fitness.

A further object is to provide an apparatus which is not harmed or disarranged by large leaks in a defective core.

Another object of my invention is the provision of a novel apparatus for core-testing which utilizes the pressure differential between a pressure source and the article under test as a measure of acceptability of the article.

A further object is to provide an apparatus which registers and holds after the conclusion of the test a visible indication of the quality of an item tested.

Further objects will become apparent from the following description in which.

Figure 1A:
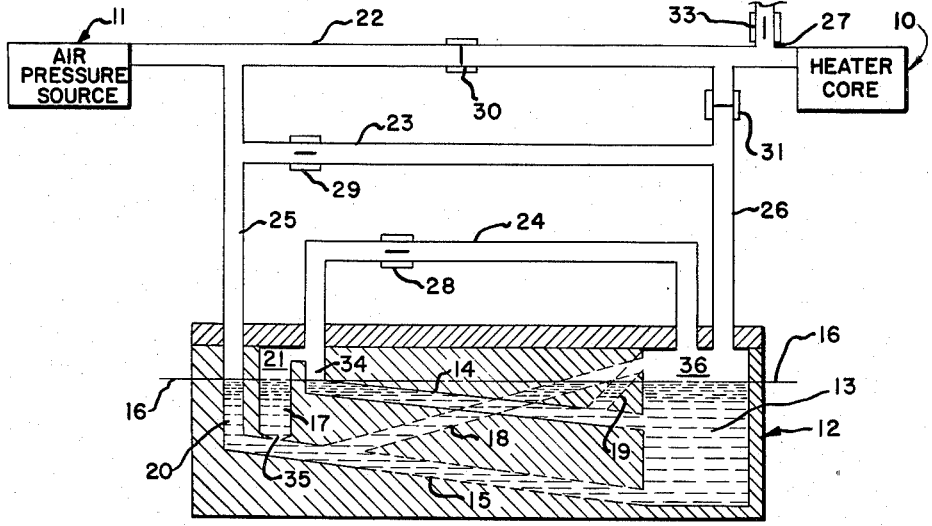
Figure 1a through 1g shows the invention in seven stages of operation.

Referring to Figure 1a, a heater core to be tested is shown generally at 10 and is arranged to be connected to a source of air pressure 11. Air pressure source 11 should be fairly well regulated. Manometer 12 is adapted to be connected between source 11 and core 10 in a manner as will subsequently be described. Manometer 12 includes a well 13 and two inclined legs 14 and 15. The higher end of manometer leg 14 is defined by upwardly extending portion 34, the upper end of which portion is in communication with, and partially defines, air portion 21. Manometer leg 15 is connected to air portion 21 through restriction 35 and bubbler tube 17. The upper end of leg 15 is terminated by vertical portion 20 leading to the top of manometer 12. Leg 14 comprises a memory tube from which the quality of the tested part is read at the conclusion of the test.

Line 16 defines the static liquid level which is desirable to be maintained within the manometer. Water is a satisfactory liquid although the manometer may be designed and calibrated for either lighter or heavier liquids, depending upon the pressure differentials which are expected to be encountered between air portion 21 and air compartment 36.

Leg 15 is in communication with an upwardly inclined purging tube 18, which tube opens into air compartment 36. Likewise, leg 14 is connected to air compartment 36 by purging tube 19. For convenience of design, tubes 18 and 19 may be replaced by a common tube which connects legs 14 and 15 intermediate their ends to air compartment 36. The function of the purging tubes will subsequently be described in connection with the operation of my invention.

Tube 24 connects air portion 21 to air compartment 36 through a normally open solenoid valve 28, as shown in Figure 1a. Tube 22 connects air pressure source 11 to core 10 through normally closed solenoid valve 30.

An inlet tube 25 connects the pressure source 11 to manometer portion 20. An outlet tube 26 connects core 10 to air compartment 36 through normally closed solenoid valve 31 as shown in Figure 1a. An equalizing tube 23 may be provided to connect inlet tube 25 to compartment 36. Tube 23 is controlled by a normally open solenoid valve 29 as shown in Figure 1a. It is apparent from an examination of Figure 1 that equalizing tube 23 is not strictly required, since it merely parallels a portion of inlet tube 25, tube 22, and outlet tube 26 and its function of equalizing the pressures at either end may be accomplished by manipulation of valves 30 and 31. However, it provides a convenient means of equalizing the pressures on the manometer without the necessity of going through the parallel path. Tube 23 also aids in preventing a sudden pressure drop at the source where several manometers are supplied from the same line.

Exhaust tube 27 and valve 33 are connected to tube 22 near the core 10 and provide a convenient means for releasing the pressurized air upon completion of a test.

In the operation of the invention, and with particular reference to Figure 1a, a heater core to be leak-tested is releasably attached to line 22 in any well known manner. It is, of course, essential that this connection, and all connections within the system, be air-tight, as a very slight air leak will invalidate the readings obtained on the manometer.

Valves 30, 31, and 33 are closed and valves 28 and 29 are open. Valve 30 is now opened connecting core 10 directly to pressure source 11. This permits rapid filling of the core without affecting the manometer.

Figure 1B:
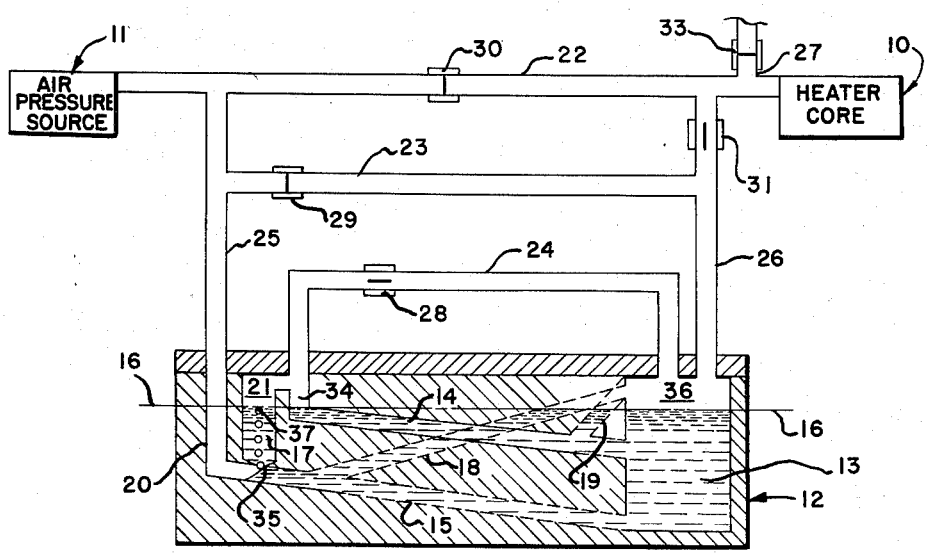
Figure 1C:
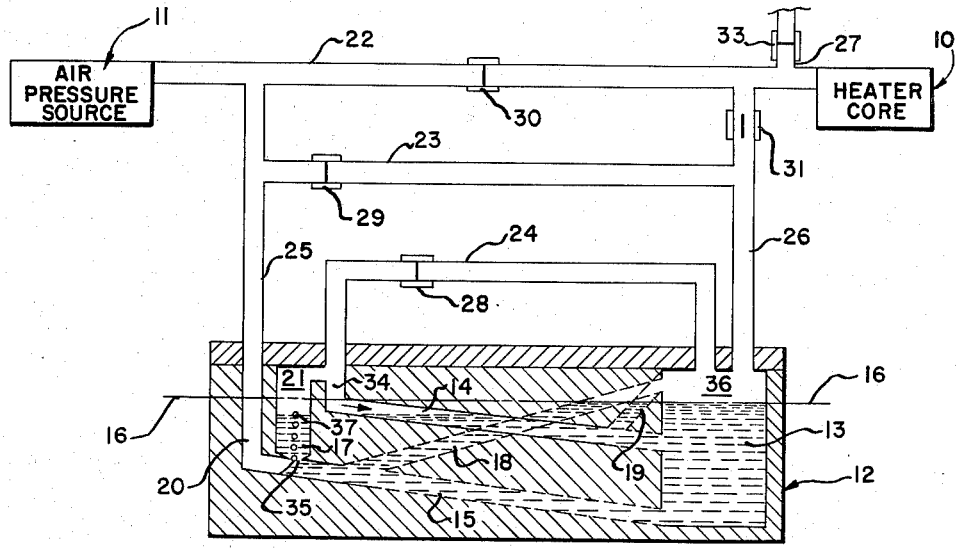
Figure 1D:
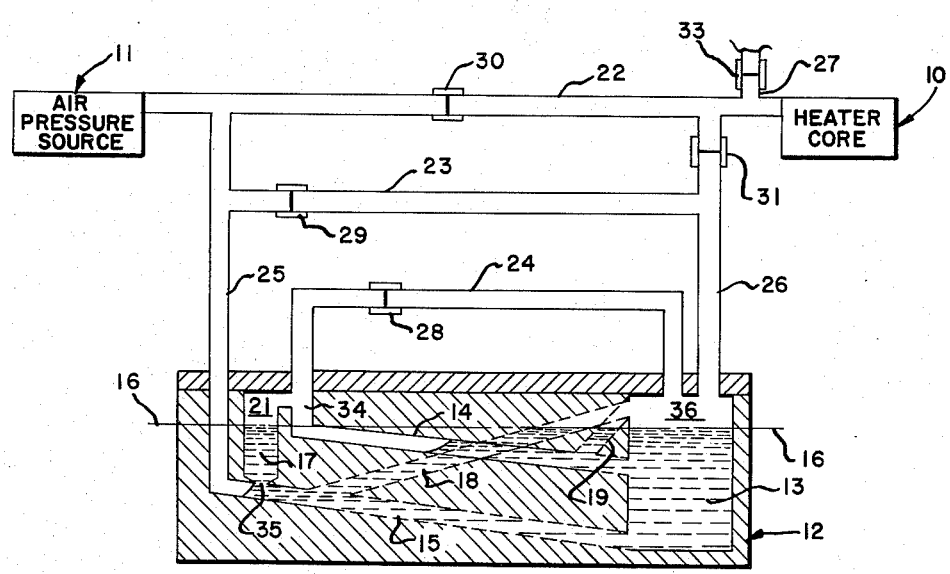
Figure 1E:
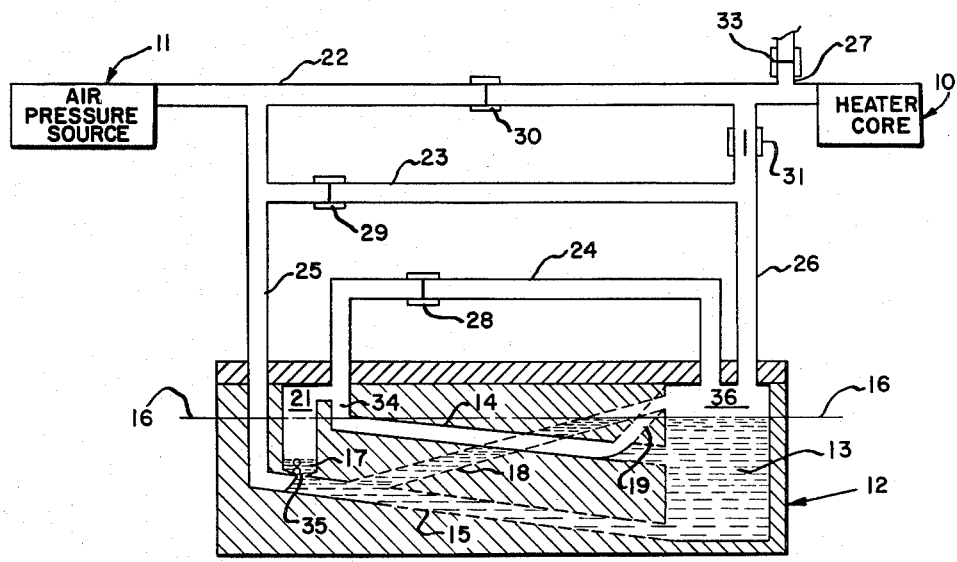
Figure 1F:
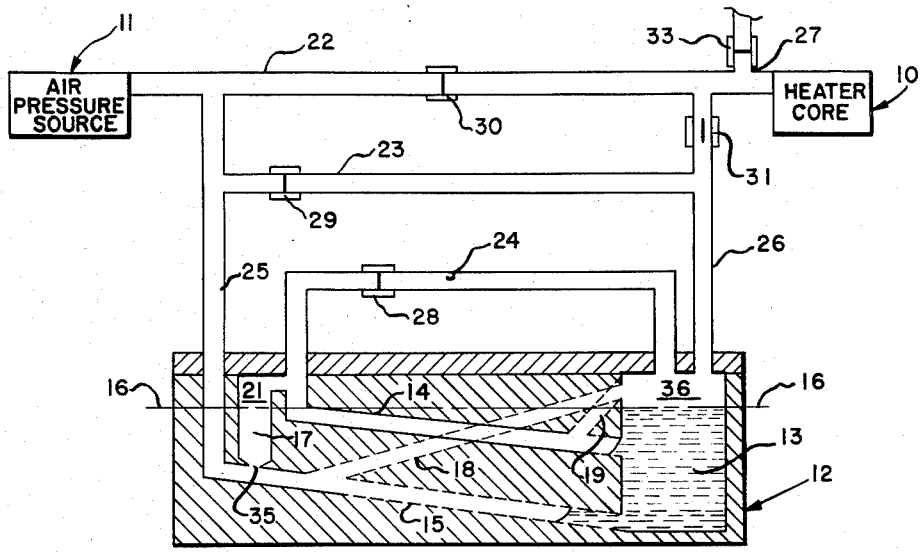

Valves 29 and 30 are now closed and valve 31 is opened. This condition is represented by Figure 1b. Core 10 is now connected to the pressure source 11 through manometer 12. This transfer should be made just before a normal core would have been fully charged with air through tube 22. The pressure difference across manometer 12 will cause a depression of the liquid level from line 16 in portion 20, and bubbles 37 will form at restriction 35 and rise to air portion 21 as shown in Figure 1b. Each bubble which combines with air portion 21 increases the air pressure, which pressure will in turn be transmitted through tube 24 to air compartment 36 and to core 10.

Valve 28 is closed after sufficient time has elapsed for a normal core to be filled, taking into consideration the fact that the walls of a heater core are flexible and do not present a fixed volume to the testing apparatus. Therefore, some time must be allowed for expansion. Bubbles which may continue to form due to an unbalance of pressure will now cause a displacement of the fluid level in member leg 14, substantially as shown in Figure 1<sup>c</sup>. After a fixed time lapse, valve 31 is closed and the manometer reading on leg 14 is held as shown in Figure 1<sup>d</sup>. The amount or extent of depression in memory leg 14 is an indication of the quality of the core that was tested. Core 10 may now be removed without disturbing this reading.

Figure 1<sup>e</sup> shows the results of a moderately large leak in the core. The fluid level in leg 14 has been depressed by bubble formation to the point where the air escapes through tube 19. The effect of a still larger leak is shown in Figure 1<sup>f</sup> where both manometer legs 14 and 15 have been purged of fluid and the air transfer takes place through tubes 18 and 19. It is therefore seen that tubes 18 and 19 prevent a sudden rush of air through the reservoir of liquid in well 13 with concomitant disarrangement and loss of liquid.

Figure 1<sup>g</sup> shows the results of closing valve 31 after a large leak. The fluid has returned along leg 15, but the maximum reading is retained in memory leg 14.

The sensitivity of the instrument is, in part, a function of the diameter of manometer leg 14 and its angle with respect to fluid level 16. Successful devices are in operation where leg 15 has an effective length of 3½" and a 3/16" diameter, forming a 7° angle with the fluid level. The accuracy of measurements also depends upon the timing of the valve sequence, since this test is in part dynamic in that time is saved by not waiting for the cessation of bubble formation but by measuring the amount of formation over a predetermined time. To this end it is convenient to use a timer to operate the solenoids, as will be subsequently described.

The manometer body itself may be made up of glass tubes connected to a well portion or the entire unit may be accurately machined from clear plastic.

Figure 2:
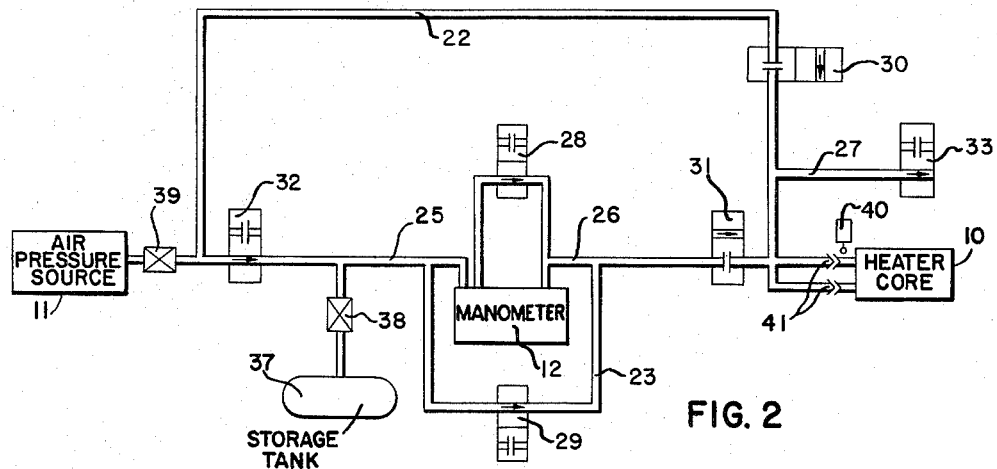
Figure 2 is a schematic representation of a conduit and valve arrangement used with my invention.

The novel apparatus lends itself to semi-automatic operation in that, once initiated, the sequence may be carried to completion automatically and the results held in memory tube 14, leaving the operator free to perform other duties. Figure 2 shows the pneumatic connection of a system designed for such semi-automatic operation. An electrical timing circuit for this system is shown in Figure 3.

Referring to Figure 2, regulated pressure source 11 is applied through hand valve 39 to tube 22 and to a normally open solenoid valve 32. A relatively large pressurized storage tank 37 is connected through hand valve 38 to inlet tube 25 between valve 32 and the manometer. Tank 37 provides a source of uniform pressure for manometer 12, and is isolated from the pressure source 11 by valve 32 and substitutes for source 11 during the progress of the test.

Fixture of the core 10 to line 41 actuates a single pole, single throw switch 40 which energizes valves 29, 32 and 33 and starts a timer motor running in a circuit which will automatically operate the valves in the proper sequence to conclude the test.

Figure 3:
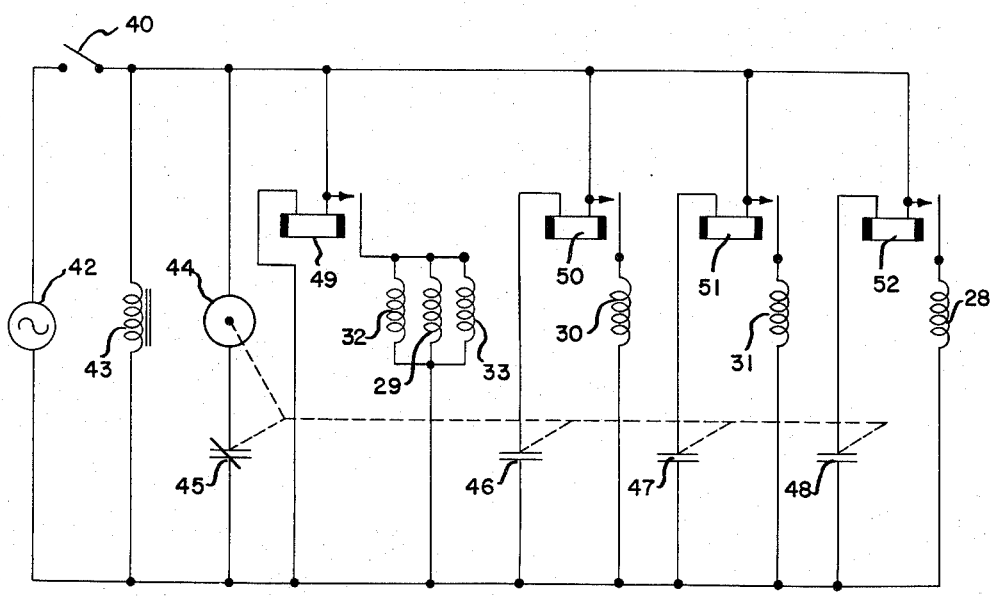
Figure 3 is a solenoid valve wiring diagram.
Figure 1G:
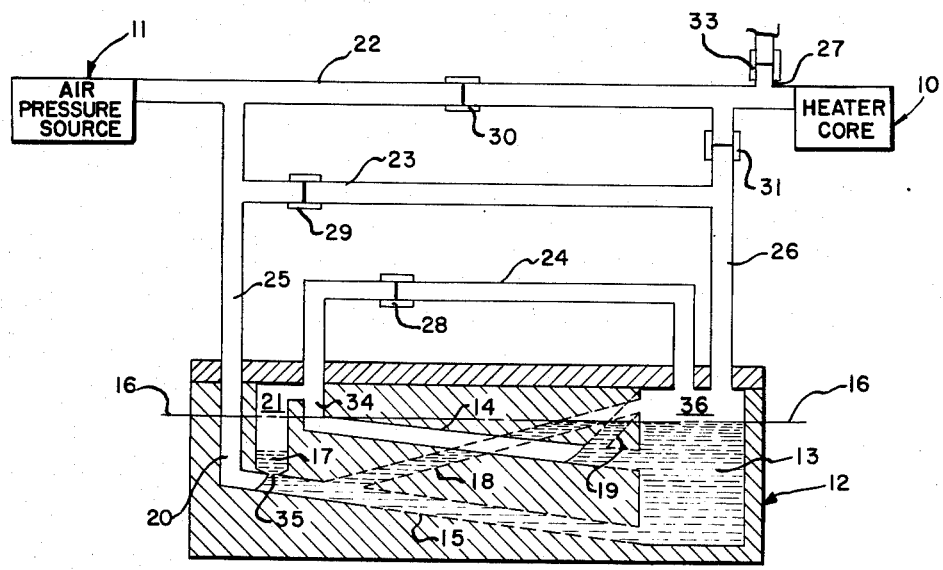

A simplified electrical schematic of a solenoid valve control circuit is shown in Figure 3. Switch 40 may be actuated by the fixture of the core to be tested, thereby connecting power source 42 to the circuit, and actuating electrical timer clutch 43. Timer 44 carries contacts 46, 47, 48 and its own circuit interrupting means 45. The application of power to the circuit causes timer 44 to run through one complete cycle. Contacts 46, 47 and 48 are associated with, and selectively operated by, the timer. Contact 45 is in the timer's normally closed contact which is broken after one revolution.

Switch 40 also actuates relay 49 thereby applying current to parallel-connected solenoids of solenoid valves 32, 29 and 33 as long as switch 40 is closed. The closure of timer contacts 46 operates relay 50 to apply current to solenoid of solenoid valve 30; the closure of contacts 47 operates relay 51 to apply current to solenoid of solenoid valve 31; and the closure of contacts 48 operates relay 52 to apply current to solenoid of solenoid valve 28.

The exact timing of the sequence depends in part upon the kind of unit being tested, its volume and its flexibility. Once the timing has been established for a given part, that timing may be used for continued testing of similar parts. However, a unit having different size or rigidity may require a different time relationship between these steps of operation. As an example only, the following description of an actual set-up is given. A heater core having a nominal volume of one pint is tested at thirty pounds per square inch pressure through a manometer having the specifications described in connection with Figure 1. The fluid has the specific gravity of kerosene. Valve 30 may be operated as soon as practicable after the operation of valves 32, 29, and 33, and a one-half to one second delay is common. The part is permitted to fill with air through valve 30 for three seconds. Then solenoid valve 30 is closed. Solenoid valve 32 may now be energized to isolate the pneumatic circuit from the primary air source 11 and the core continues to expand and fill from tank 37 for an additional twenty seconds. This filling is slow and somewhat asymptotic as the core was substantially pressurized during the first three seconds through valve 30. At the conclusion of the twenty seconds, solenoid valve 28 is energized and a reading is accumulated within manometer 12 for an additional 30 seconds. Thirty seconds has been found sufficient for an accurate indication of the core's quality as sufficient time has already been allowed for the filling and expansion of a normal core.

It is apparent that the choice of solenoid valves—whether they are normally open or normally closed—is mainly a matter of preference, and suitable electrical circuitry can be designed by anyone skilled in the art. Electrical contacts may be used in the manometers for remotely indicating the test results or for automatically ending the test when a leak is detected.

Figure 4:
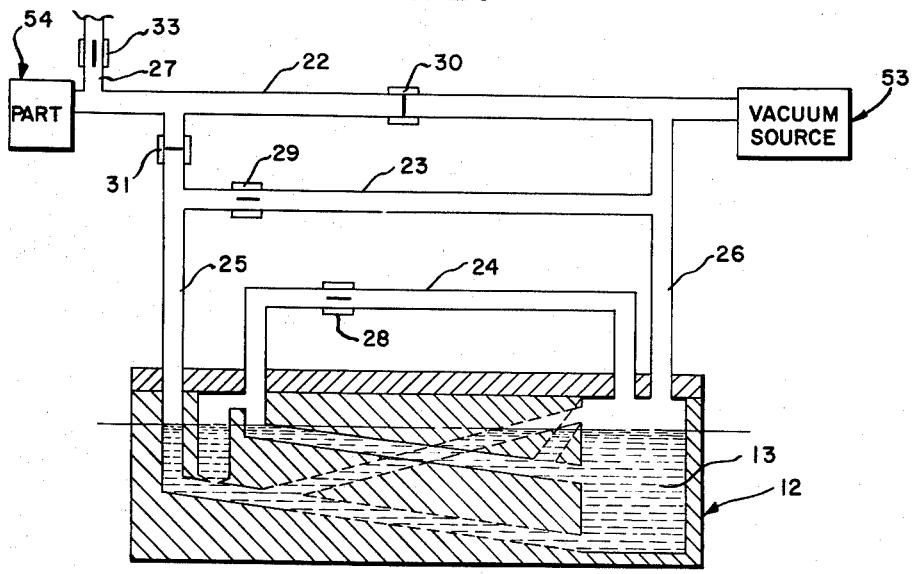
Figure 4 represents an adaptation of my invention for vacuum testing.

My invention has until now been described for the pressure testing of parts. It may be readily adapted for vacuum testing, as shown in Figure 4. A source of reduced pressure or vacuum 53 is connected in place of the core 10 in Figure 1. A part 54 to be vacuum tested is connected in place of pressure source 11 in Figure 1. Exhaust valve 33 and isolation valve 31 assume relative and equivalent positions with respect to part 51. The remainder of the set-up and the operating procedure remain unchanged.

What is claimed is:

1. A device for measuring pressure differences between two air pressure sources comprising a body, said body defining: a liquid reservoir, said reservoir having a liquid portion and an air portion, a bubbler tube, an inlet tube, a bottom portion of said bubbler tube in communication with said inlet tube, a common connecting means between said bottom portion and said liquid portion of said reservoir, an inclined manometer leg with a lower end opened into said liquid portion, a common air portion connecting the upper end of said manometer leg to said bubbler tube, an outlet tube in communication with the air portion of said reservoir.

2. The device as defined in claim 1 including a purging tube with one end thereof connected at the air portion of said reservoir and the other end opening into said manometer leg.

3. A device for measuring pressure difference between two pressure sources comprising means defining a reservoir having a liquid portion and a gas portion, means defining a bubbler tube having a bottom opening and a top opening, said bubbler tube being in communication with one pressure source at said bottom opening, means connecting said bottom opening to the liquid portion of said reservoir, means defining an inclined manometer with a lower end in communication with said liquid portion and an upper end in communication with the top opening of said bubbler tube, and said gas portion in communication with another pressure source.

References Cited in the file of this patent

UNITED STATES PATENTS

| | | |
|---|---|---|
| 1,582,942 | Thomas | May 4, 1926 |
| 1,720,934 | Toleik | July 16, 1929 |
| 1,901,432 | Bradley | Mar. 14, 1933 |
| 2,434,837 | Cornett | Jan. 20, 1948 |
| 2,500,067 | Gauthier | Mar. 7, 1950 |
| 2,591,197 | Rau | Apr. 1, 1952 |
| 2,684,593 | Rothstein | July 27, 1954 |
| 2,853,874 | Mennesson | Sept. 30, 1958 |

FOREIGN PATENTS

| | | |
|---|---|---|
| 1,114,506 | France | Dec. 19, 1955 |